(12) United States Patent
Asada et al.

(10) Patent No.: US 6,505,975 B2
(45) Date of Patent: Jan. 14, 2003

(54) CONNECTOR FOR OPTICAL FIBER CORD

(75) Inventors: Kazuhiro Asada, Nagoya (JP); Yuji Nakura, Nagoya (JP)

(73) Assignees: Autonetworks Technologies, Ltd., Nagoya (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/906,805

(22) Filed: Jul. 18, 2001

(65) Prior Publication Data
US 2002/0015564 A1 Feb. 7, 2002

(30) Foreign Application Priority Data

Jul. 24, 2000 (JP) ......................................... 2000-222580
Feb. 19, 2001 (JP) ......................................... 2001-041535

(51) Int. Cl.⁷ ............................................... G02B 6/38
(52) U.S. Cl. .............................. 385/72; 385/60; 385/78
(58) Field of Search ............................. 385/70, 72, 78, 385/53, 54, 55, 60

(56) References Cited

U.S. PATENT DOCUMENTS

| 5,224,186 A | 6/1993 | Kishimoto et al. ........... 385/78 |
| 5,335,301 A * | 8/1994 | Newman et al. .............. 385/75 |
| 5,588,079 A | 12/1996 | Tanabe et al. ................ 385/78 |
| 5,815,618 A * | 9/1998 | Takahashi et al. ............ 385/60 |
| 6,227,721 B1 | 5/2001 | Naito et al. .................... 385/78 |
| 6,247,851 B1 | 6/2001 | Ichihara ........................ 385/56 |
| 6,283,640 B1 * | 9/2001 | Stephenson et al. .......... 385/58 |
| 6,283,643 B1 * | 9/2001 | Serizawa ...................... 385/81 |
| 6,331,079 B1 * | 12/2001 | Grois et al. ................... 385/53 |
| 6,347,888 B1 * | 2/2002 | Puetz ............................ 385/53 |

FOREIGN PATENT DOCUMENTS

| DE | 3637746 A1 | 5/1988 |
| EP | 0 667 544 A1 | 8/1995 |
| EP | 0 733 922 A1 | 9/1996 |
| JP | A 61-052614 | 3/1986 |
| JP | A 01-072107 | 3/1989 |
| JP | A 10-078534 | 3/1998 |

* cited by examiner

*Primary Examiner*—Lynn Field
*Assistant Examiner*—Michael C. Zarroli
(74) *Attorney, Agent, or Firm*—Oliff & Berridge, PLC

(57) ABSTRACT

An optical connector is provided for connecting an optical fiber cord to a photoelectric conversion device or for connecting optical fiber cords together. The connector has a housing body including a tubular ferrule portion for receiving and holding an end of an optical fiber cord. A protective hood is formed integrally with the housing body and is disposed around the ferrule portion, extending beyond the terminal end of the ferrule portion. Optionally, the connector is adapted to be connected to a mating optical connector which contains a photoelectric conversion device.

11 Claims, 14 Drawing Sheets

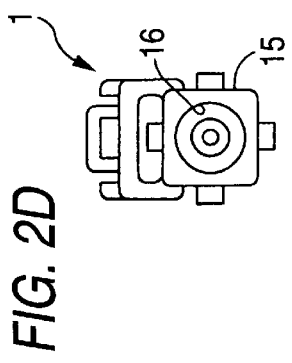
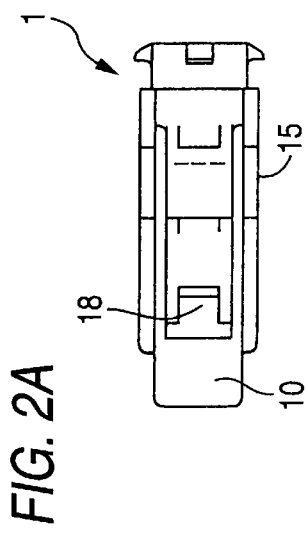
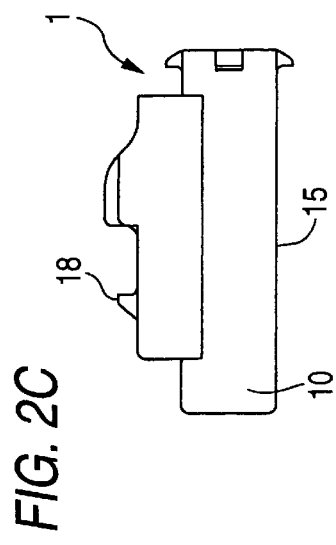
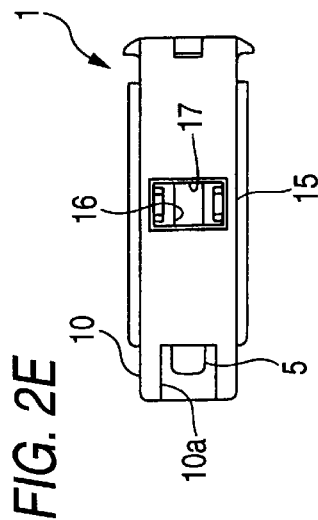
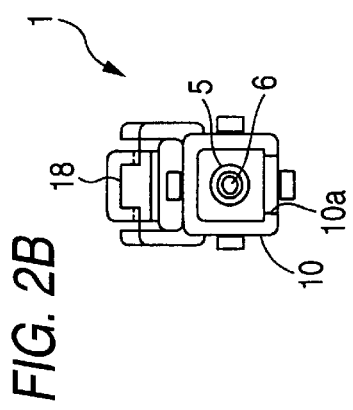

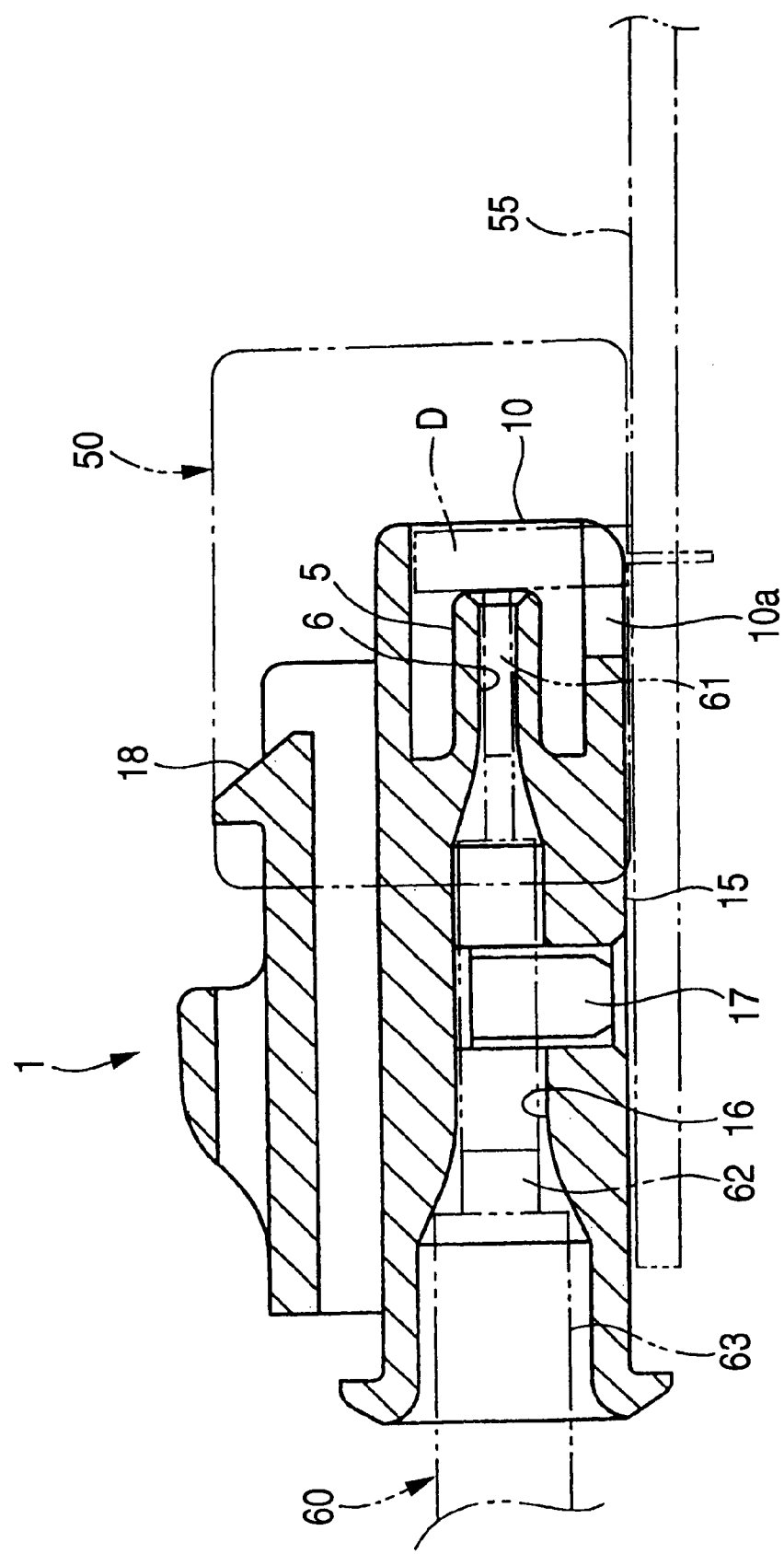

CONNECTOR FOR OPTICAL FIBER CORD

BACKGROUND OF THE INVENTION

1. [Technical Field]

This invention relates to an optical connector for connecting an optical fiber cord to a photoelectric conversion device or for connecting optical fiber cords together.

2. [Related Art]

One conventional optical connector of the type described above includes a ferrule for holding an end portion of an optical fiber, and a housing which has a protective hood covering the ferrule in surrounding relation thereto to protect it, the ferrule and the housing being formed integrally with each other.

On the other hand, there is known the type of connector (as disclosed in the Unexamined Japanese Patent Application Publication No. Hei10-78534) which includes a ferrule for holding an optical fiber, and a housing having a protective hood for protecting the ferrule, the ferrule and the housing being separate from each other.

[Problems to be Solved]

The former one of the above conventional optical connectors has an advantage that the production of this connector is easy since the ferrule and the housing are formed integrally with each other.

In this optical connector, however, the distal end of the ferrule need to be projected beyond the distal end of the protective hood so that the end of the optical fiber can be easily processed into a specular surface (mirror surface) at the distal end of the ferrule, and in this case there is encountered a problem that the end surface of the optical fiber at the end of the ferrule can not be sufficiently protected.

This will be described in further detail. If the distal end of the ferrule is disposed in a sequestered position within the protective hood, the specular processing of the optical fiber end can not be effected easily because the protective hood hinders this processing. Even if the specular processing of the end surface of the optical fiber can be effected, there is encountered a problem that it is difficult to inspect the condition of the end portion of the ferrule (for example, the projection and recession of the optical fiber relative to the distal end of the ferrule, a distortion, a flaw and a crack of the optical fiber, and soon) after this specular processing. Therefore, in the type of connector in which the ferrule and the housing are formed integrally with each other, it is necessary that the distal end of the ferrule should be projected beyond the distal end of the protective hood.

On the other hand, in the latter one of the above conventional optical connectors, the optical fiber is passed through the ferrule, and the specular processing is applied to the end surface of the optical fiber, and the condition of the distal end of the ferrule is inspected, and then this ferrule can be mounted in the housing. Therefore, in this optical connector, even if the distal end portion of the ferrule is disposed in a sequestered position within the protective hood, the above specular processing will not be affected at all. Therefore, the easiness of the specular processing and the sufficient protection of the optical fiber end can be both achieved.

However, this optical connector requires at least two component parts, that is, the ferrule and the housing, and besides it is necessary to combine them together, and therefore there is encountered a problem that the production of this connector is complicated.

SUMMARY OF THE INVENTION

It is therefore an object of this invention to provide an optical connector in which the production is easy, and a specular processing of an optical fiber at an end of a ferrule portion can be effected easily, and an end surface of the optical fiber at the end of the ferrule portion can be sufficiently protected.

[Means for Solving the Problems]

According to the present invention, there is provided an optical connector including a housing body portion, and a substantially tubular ferrule portion for receiving and holding an end portion of an optical fiber, the ferrule portion being formed integrally with and projecting from the housing body portion;

wherein a protective hood portion of a substantially tubular shape is formed integrally with and projects from the housing body portion in surrounding relation to the ferrule portion, and extends beyond a distal end of the ferrule portion, and a notch, through which the distal end portion of the ferrule portion can be observed from the side, is formed in a distal end portion of the protective hood portion.

Preferably, the notch is formed into such a shape that when the distal end of the ferrule portion is pressed toward a flat member at any angle, the ferrule portion will not abut against the flat member.

The protective hood portion can be formed into a substantially square tubular shape, and one side wall of the protective hood portion can be notched.

The protective hood portion can be formed into a substantially square tubular shape, and opposed two side walls of the protective hood portion can be notched.

The protective hood portion can be formed into a substantially square tubular shape, and four side walls of the protective hood portion can be notched with four corner portions thereof remaining intact.

According to another aspect of the invention, there is provided an optical connector including a housing body portion, and a plurality of substantially tubular ferrule portions for respectively receiving and holding end portions of optical fibers, the ferrule portions being formed integrally with the housing body portion;

wherein a protective hood portion of a substantially tubular shape is formed integrally with and projects from the housing body portion in surrounding relation to the plurality of ferrule portions, and extends beyond distal ends of the ferrule portions, and a notch, through which the distal end portions of the ferrule portions can be observed from the side, is formed in a distal end portion of the protective hood portion.

A partition wall, separating the ferrule portions from each other, can be formed integrally with the housing body portion.

The optical connector is adapted to be connected to a mating optical connector which contains a photoelectric conversion device, and is mounted on a predetermined mounting board, and that side wall of the protective hood portion, which is to be opposed to the mounting board when the optical connector is connected to the mating optical connector, is notched.

Outwardly-projecting, elongate projections can be formed respectively at those portions of the protective hood portion, respectively defining opposite side edges of the notch, and extend in a direction of insertion of the optical connector into the mating optical connector.

BRIEF DESCRIPTION OF THE DRAWINGS

FIG. 2A is a plan view of the optical connector, FIG. 2B is a front-elevational view of the optical connector, FIG. 2C is a side-elevational view of the optical connector, FIG. 2D is a rear view of the optical connector, and FIG. 2E is a bottom view of the optical connector.

FIG. 3 is a cross-sectional view of the optical connector.

DETAILED DESCRIPTION OF THE PREFERRED EMBODIMENTS

[Mode for Carrying out the Invention]
(First Embodiment)

A first embodiment of the present invention will now be described.

Figure 1:
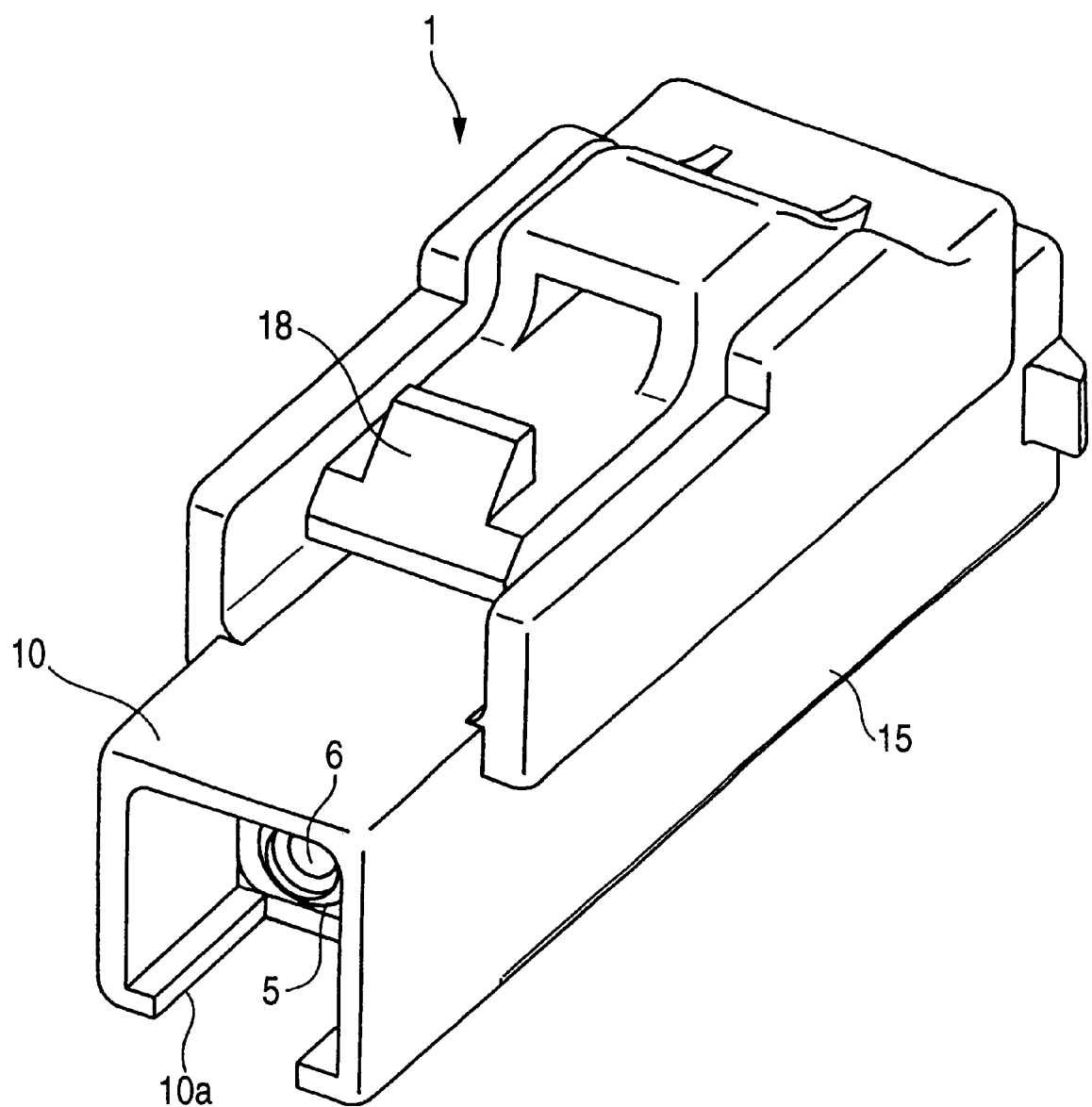
FIG. 1 is a perspective view showing a first embodiment of an optical connector of the present invention.

As shown in FIGS. 1 to 3, this optical connector 1 is made of a resin or the like, and includes a ferrule portion 5 for receiving and holding an end portion of an optical fiber 61, exposed at an end portion of an optical fiber cord 60, and a protective hood portion 10 provided in surrounding relation this ferrule portion 5, and the ferrule portion 5 and the protective hood portion 10 are formed integrally with a housing body portion 15.

The housing body portion 15 is formed into a substantially square tubular shape, and has a receiving hole portion 16 formed therein along an axis thereof (see FIG. 3).

The optical fiber cord 60, inserted and held in the receiving hole portion 16 in a positioned condition, comprises the optical fiber 61, comprising a core and a clad, a first covering portion 62, and a second covering portion 63, the first and second covering portions 62 and 63 being formed or coated on an outer periphery of the optical fiber 61, as indicated in dots-and-dash lines in FIG. 3. The second covering portion 63 is removed over a predetermined length from the end portion of the optical fiber cord 60 to expose the first covering portion 62, and further the first covering portion 62 is removed over a predetermined length from a distal end portion of the second covering portion-removed portion of the optical fiber cord 60 to expose the optical fiber 61 (see FIG. 2).

The receiving hole portion 16 is formed into such a hole shape as to receive the first and second covering portions 62 and 63 at the end portion of the optical fiber cord 60, and when the end portion of the optical fiber cord 60 is inserted into the receiving hole portion 16 from the rear end thereof, the first and second covering portions 62 and 63 are received and disposed in the receiving hole portion 16.

A positioning hole 17 is formed in a bottom portion of the housing body portion 15, and when a positioning member (not shown) is inserted into the receiving hole portion 16 through this positioning hole 17, and is brought into biting engagement with the first covering portion 62 of the optical fiber cord 60, the optical fiber cord 60 is held and positioned in its axial direction within the receiving hole portion 16.

An engagement portion 18 for engagement with an engaging portion (not shown), formed on a mating optical connector 50, is formed on an upper surface of the housing body portion 15, and when the optical connector 1 is connected to the mating optical connector 50, the engagement portion 18 is engaged with the engaging portion, thereby holding the optical connectors 1 and 50 in the connected condition.

The ferrule portion 5 is formed integrally with the housing body portion 15, and projects from the front end of the housing body portion 15. The ferrule portion 5 is formed into a substantially cylindrical shape, and an optical fiber passage hole portion 6, having an inner diameter substantially equal to the outer diameter of the optical fiber 61, is formed in this ferrule portion, and is disposed on a line of extension of the receiving hole portion 16, and extends from the front end of the receiving hole portion 16. When the optical fiber cord 60 is inserted into the receiving hole portion 16 from the rear end thereof, the exposed end portion of the optical fiber 61 at the distal end portion of the optical fiber cord is inserted and located in the optical fiber passage hole portion 6, and the exposed end portion of the optical fiber 61 is received and held in the optical fiber passage hole portion 6 in such a manner that it is positioned in its radial direction. The exposed end portion of the optical fiber 61, thus received and held in the ferrule portion 5, is subjected to a specular processing as described later. Then, when the optical connector 1 is connected to the mating optical connector 50, the end surface of the optical fiber 61 is disposed in opposed relation to a light-receiving surface, a light-emitting surface or other surface of a photoelectric conversion device (a light-emitting device or a light-receiving device) D received and held in the mating optical connector 50, so that the optical fiber and the photoelectric conversion device are optically coupled together.

The protective hood portion 10 has a substantially tubular shape, and extends beyond the distal end of the ferrule portion 5 in surrounding relation thereto, and projects from the front end of the housing body portion 15, and is formed integrally with this housing body portion 15.

The protective hood portion 10 thus extends beyond the distal end of the ferrule portion 5 so that when the ferrule portion 5 is pressed toward a predetermined flat surface while kept in a posture perpendicular to this flat surface, the protective hood portion 10 can abut against this flat surface, thereby preventing the distal end of the ferrule portion 5 from abutting against this flat surface.

A notch of a predetermined shape is formed in part of the distal end portion of the protective hood portion 10.

This notch need to have such a shape that the distal end portion of the ferrule portion 5 can be observed through this notch at least from the side. Preferably, this notch is so formed that when the distal end of the ferrule portion 5 is pressed toward a flat member at any angle, the ferrule portion 5 will not abut against this flat member.

In this first embodiment, the notch 10*a* is formed in a lower wall of the protective hood portion 10 of a substantially square tubular shape (having a substantially square cross-section), the notch 10*a* having a width slightly smaller than a width of the protective hood portion 10. This notch 10*a* has such a size that the distal end portion of the ferrule portion 5 is exposed to the exterior of the protective hood portion 10 through this notch 10*a,* and therefore the distal end portion of the ferrule portion 5 can be observed through the notch 10*a* from the side of the protective hood portion (see FIG. 2E).

Figure 4:
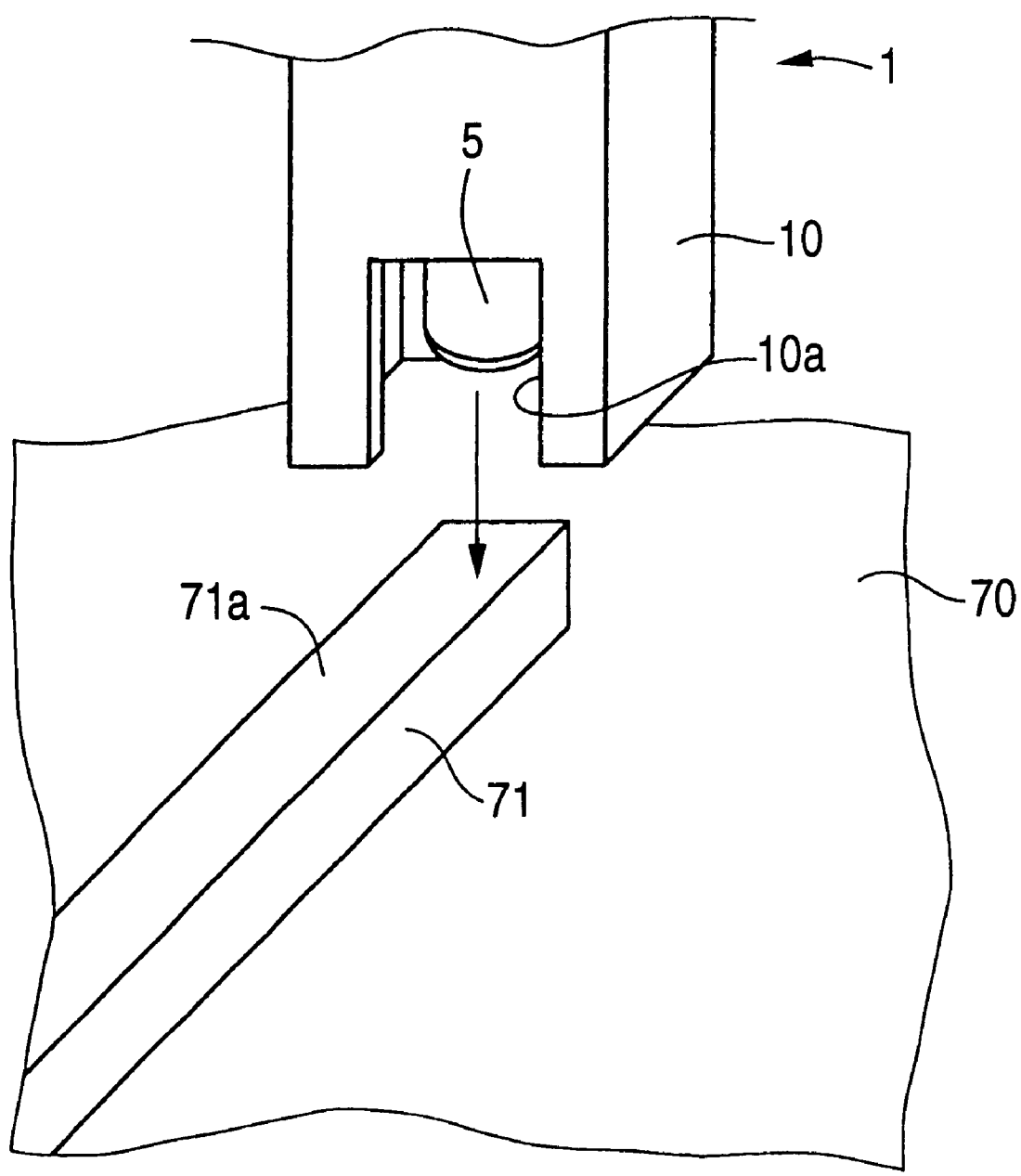
FIG. 4 is a perspective view showing a process of applying a specular processing to an end surface of an optical fiber.

In the optical connector 1 of this construction, the operation for processing the end surface of the optical fiber 61 (received and held in the ferrule portion 5) into a specular surface can be effected, for example, by the use of an end surface-processing apparatus (as shown in FIG. 4) according to the following procedure.

In this end surface-processing apparatus, a specular processing member 71 of a narrow, elongate square pillar-like shape is placed and fixed on a heating plate 70 heated by a heater (not shown). This specular processing member 71 is smaller in width than the notch 10*a,* and an upper surface of this member 71 is formed into a specular surface 71*a.* The exposed end portion of the optical fiber 61 at the end portion of the optical fiber cord 60 is inserted into the ferrule portion 5, and the distal end of the optical fiber 61 is slightly projected from the distal end of the ferrule portion 5, and in this condition the end surface of the optical fiber 61 is pressed into contact with the specular surface 71*a* of the specular processing member 71 in such a manner that the specular processing member 71 is received in the protective hood portion 10 through the notch 10*a.* At this time, the distal end of the ferrule portion 5 can be moved toward the specular processing member 71, using the notch 10*a* as a yardstick, and the above press-contacting operation can be effected while viewing the positional relation between the distal end of the ferrule portion 5 and the specular processing member 71 through the notch 10*a.* As a result, the end surface of the optical fiber 61, projecting from the distal end of the ferrule portion 5, is pressed against the specular surface 71*a,* and is fused to be subjected to the specular processing.

In the optical connector 1 of the above construction, the ferrule portion 5 and the protective hood portion 10 are both formed integrally with the housing body portion 15, and therefore the number of the component parts, as well as the time and labor required for the assembling operation, can be reduced as compared with the conventional construction in which the ferrule and the protective hood are separate from each other. Therefore, the production of the optical connector is easy.

The protective hood portion 10 has a substantially square tubular shape, and extends beyond the distal end of the ferrule portion 5 in surrounding relation thereto, and the notch 10*a,* through which the distal end portion of the ferrule portion 5 can be observed from the side, is formed in the distal end portion of the protective hood portion 10. Therefore, the end surface of the optical fiber 61 at the end of the ferrule portion 5 can be sufficiently protected as compared with the conventional construction in which the distal end portion of the ferrule projects beyond the protective hood.

And besides, the notch 10*a* is formed in the protective hood portion 10, and therefore the specular processing operation can be easily effected, utilizing the notch 10*a,* for example, while viewing the positional relation between the distal end portion of the ferrule portion 5 and the predetermined specular processing member 71 through the notch 10*a.*

In addition, after the specular processing operation, the condition of the distal end portion of the ferrule portion 5 (for example, the projection and recession of the optical fiber 61 relative to the distal end of the ferrule portion 5, a distortion, a flaw and a crack of the optical fiber 61, and so on) can be easily inspected. Therefore, the defective optical connector 1 can be found and removed.

In this first embodiment, the notch 10*a* is formed in the lower wall of the protective hood portion 10, and when this optical connector is connected to the mating optical connector 50 mounted on a predetermined mounting board 55 as shown in FIG. 3, the notch 10*a* faces this mounting board 55. With this construction, the following advantage is obtained.

When connecting this optical connector 1 to the mating optical connector 50, the distal end surface of the optical fiber 61, received and held in the ferrule portion 5, need to be optically coupled to the light-receiving surface or the light-emitting surface of the photoelectric conversion device D. In this optical connector 1, however, the distal end of the ferrule portion 5 is disposed in a sequestered position within the protective hood portion 10, and therefore if the notch 10*a* is not formed, there are occasions when the photoelectric conversion device D can not be received in the protective hood portion 10 because of the size and shape of this photoelectric conversion device D. In this case, a predetermined light-conducting member need to be interposed between the photoelectric conversion device D (disposed outwardly of the open end of the protective hood portion 10) and the distal end of the ferrule portion 5 (disposed within the protective hood portion 10) so as to optically couple the two together, and therefore there is a fear that the optical connector 50 becomes complicated in construction. In this optical connector 1, however, the notch 10*a* is formed in the protective hood portion 10, and therefore the photoelectric conversion device D can be received in the protective hood portion 10, and can be disposed near to the end surface of the optical fiber 61 in such a manner that part of this device D projects outwardly from the interior of the protective hood portion 10, and therefore the two can be directly optically coupled together, and there is achieved an advantage that the optical connector 50 can be simplified in construction.

(Modifications of the First Embodiment)

In this optical connector 1, the notch 10*a,* formed in the protective hood portion 10, is not limited to the shape shown in FIGS. 1 to 4, but can have any other suitable shape in so far as the above conditions are satisfied for the substantially-tubular ferrule portion 5.

Modified examples of the protective hood portion 10 will be described below. In the following description, those constituent elements, identical to those of the first embodiment, will be designated by identical reference numerals, respectively, and explanation thereof will be omitted, and a different constituent element, that is, a protective hood portion 10, will be mainly described.

Figure 5:
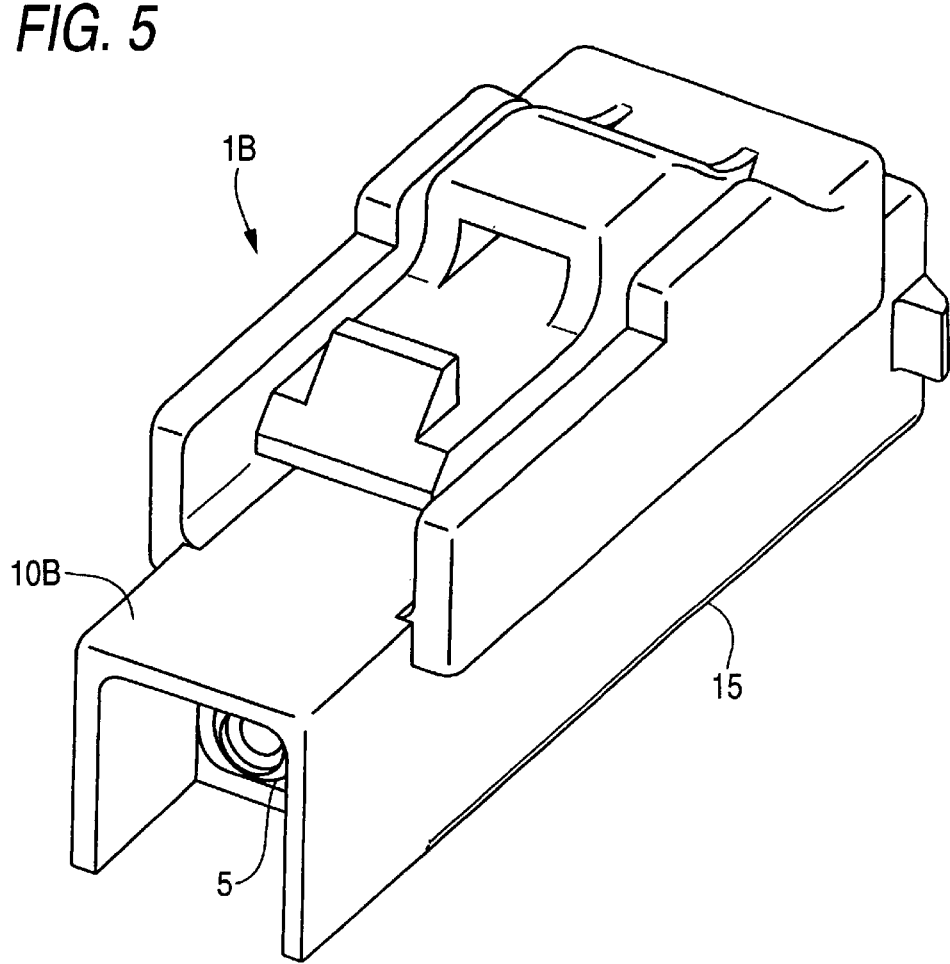
FIG. 5 is a perspective view of a first modified optical connector.
Figure 6:
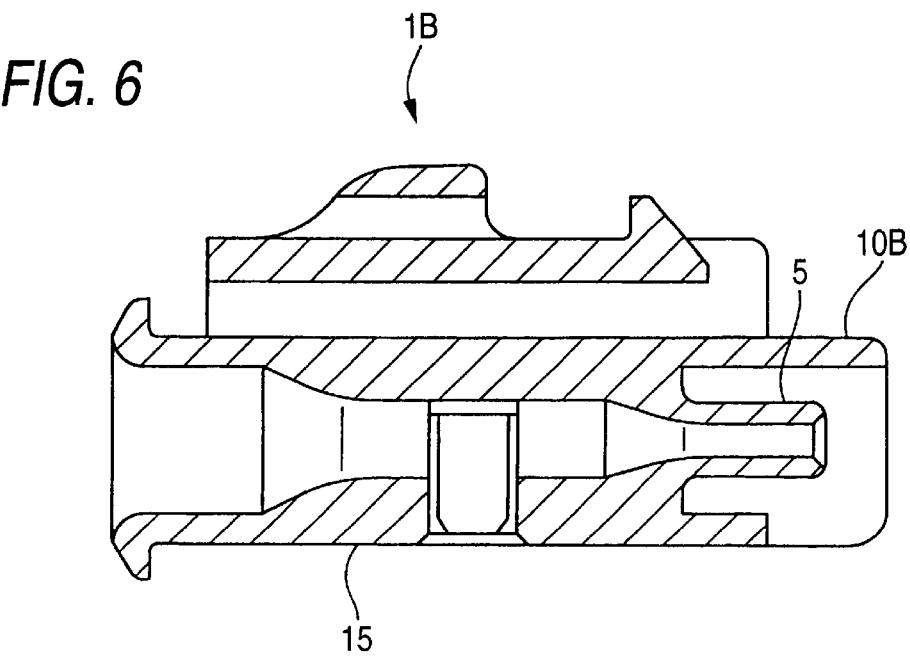
FIG. 6 is a cross-sectional view of the optical connector of FIG. 5.

In a first modified optical connector 1B shown in FIGS. 5 and 6, a protective hood portion 10B is formed into a substantially square tubular shape, having a substantially square cross-section, and surrounds a ferrule portion 5, and a notch is formed in a lower wall of the protective hood portion 10 over an entire width thereof, with opposite side walls and an upper wall thereof remaining intact.

Figure 7:
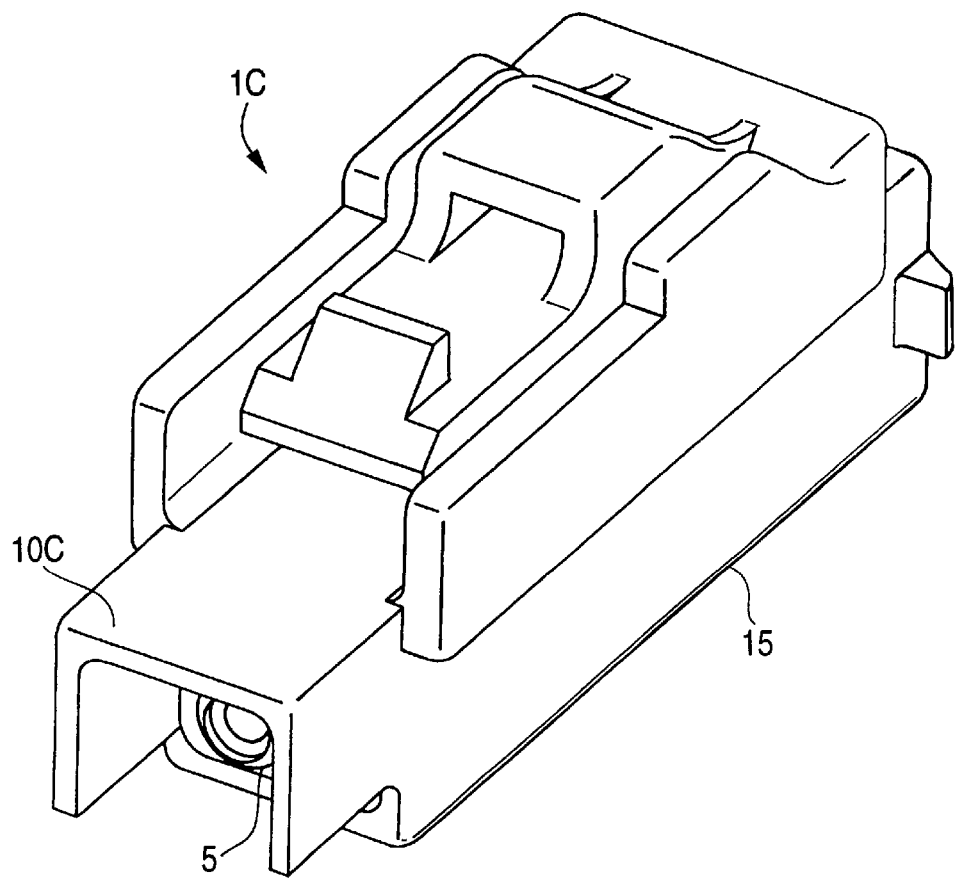
FIG. 7 is a perspective view of a second modified optical connector.
Figure 8:
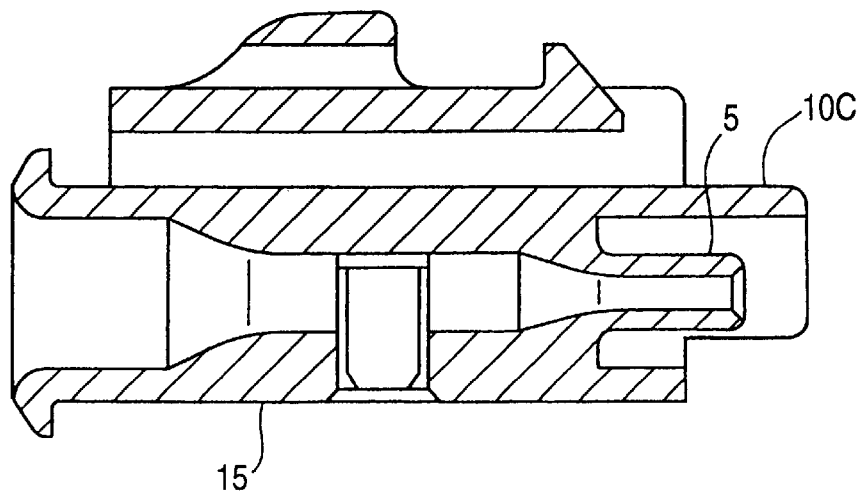
FIG. 8 is a cross-sectional view of the optical connector of FIG. 7.

In a second modified optical connector 1C shown in FIGS. 7 and 8, a protective hood portion 10C is formed into a substantially square tubular shape, having a substantially square cross-section, and surrounds a ferrule portion 5, and a notch is formed in a lower wall of the protective hood portion 10C over an entire width thereof, and also is formed in lower portions of opposite side walls of this protective hood portion 10C.

Figure 9:
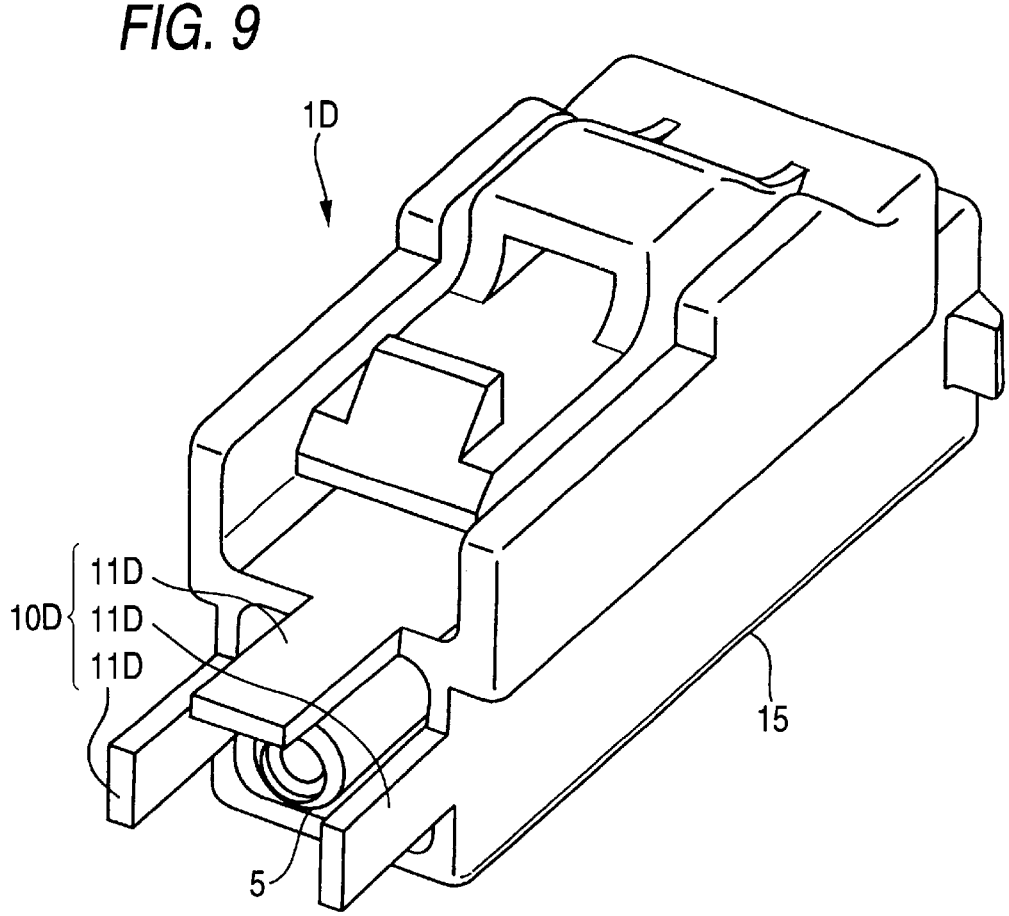
FIG. 9 is a perspective view of a third modified optical connector.
Figure 10:
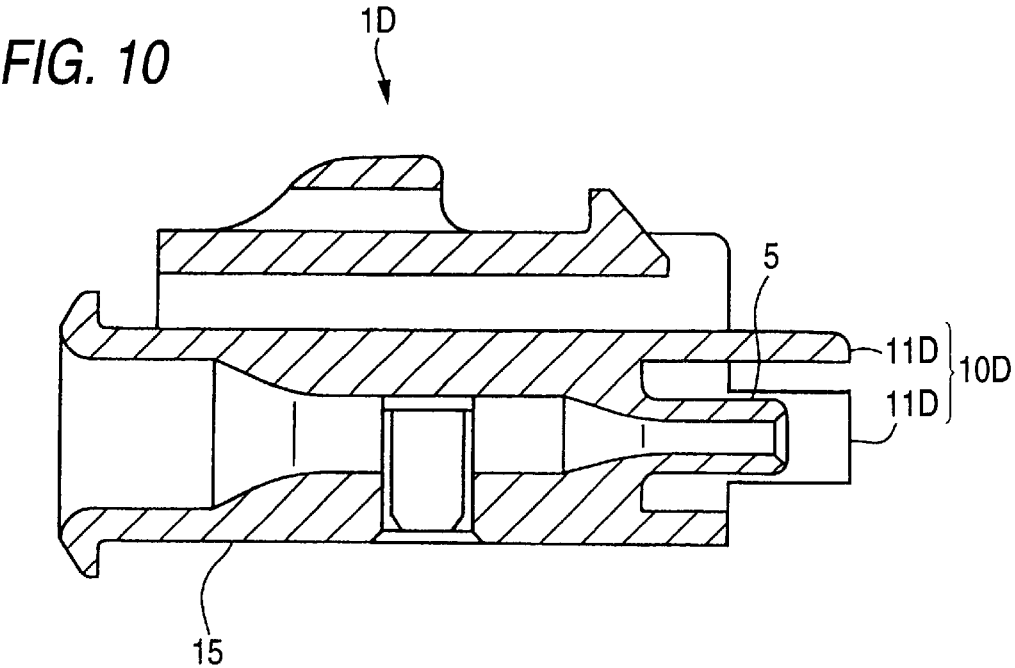
FIG. 10 is a cross-sectional view of the optical connector of FIG. 9.

In a third modified optical connector 1D shown in FIGS. 9 and 10, a protective hood portion 10D is formed into a substantially square tubular shape, having a substantially square cross-section, and surrounds a ferrule portion 5, and a notch is formed in a lower wall of the protective hood portion 10D over an entire width thereof, and also is formed in lower portions of opposite side walls of this protective hood portion 10D, and further notches are formed respectively in upper corner portions of opposite side walls of the protective hood portion 10D. Namely, this protective hood portion 10D is formed by three extension piece portions 11D extending respectively from opposite side walls and an upper wall of a housing body portion 15 in a direction away from a rear end of this housing body portion 15, and these extension piece portions 11D surround the ferrule portion 5 from three directions, that is, from the right, left and upper sides of the ferrule portion 5, and are disposed at predetermined intervals.

Figure 11:
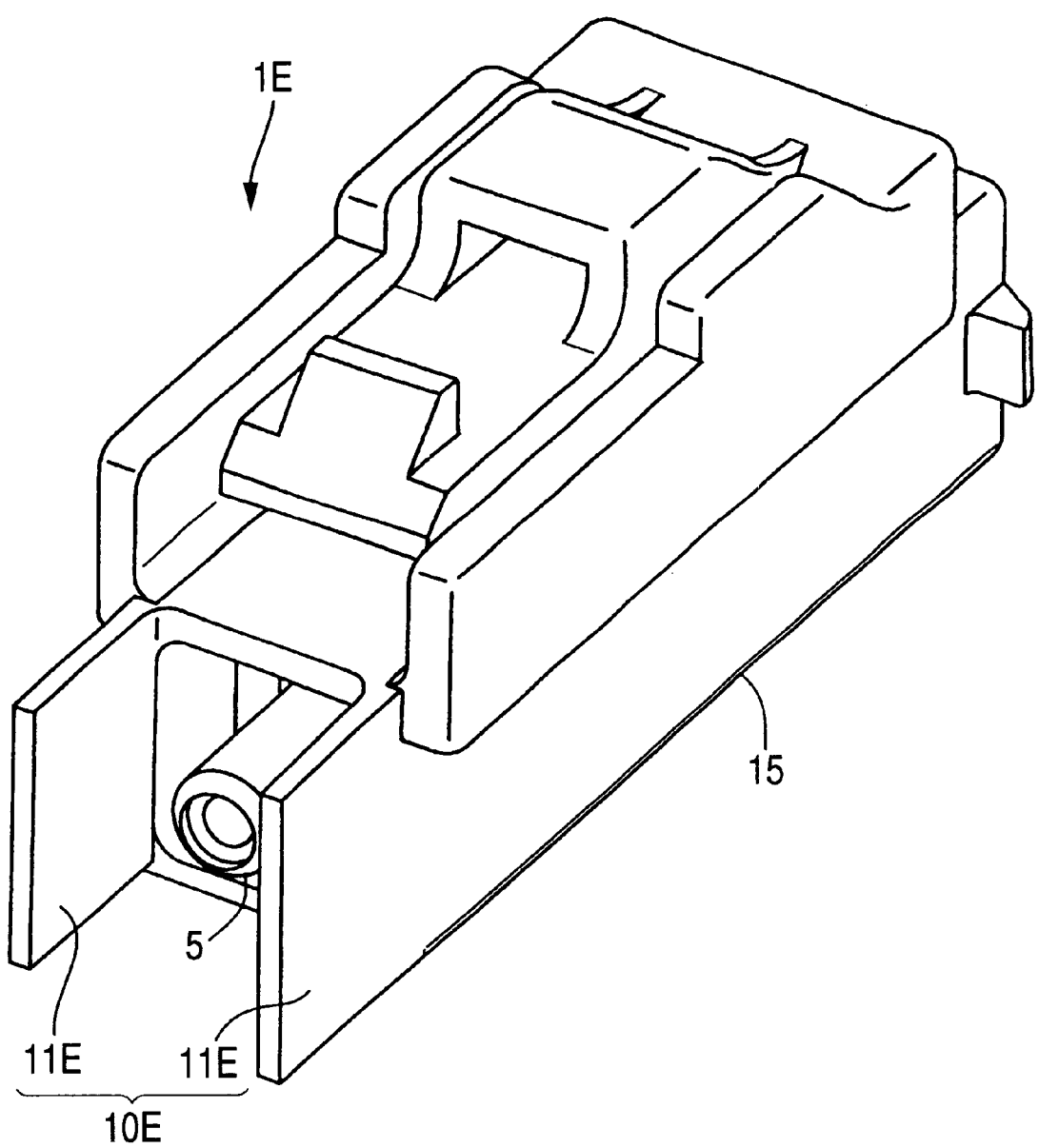
FIG. 11 is a perspective view of a fourth modified optical connector.

In a fourth modified optical connector 10E shown in FIG. 11, a protective hood portion 10E is formed into a substantially square tubular shape, having a substantially square cross-section, and surrounds a ferrule portion 5, and a notch is formed in an upper wall of the protective hood portion 10E over an entire width thereof while another notch is formed in a lower wall thereof over an entire width thereof. Namely, the protective hood portion 10E is formed by a pair of extension piece portions 11E extending respectively from opposite side walls of a housing body portion 15 in a direction away from a rear end of this housing body portion 15, and these extension piece portions 11E face each other with the ferrule portion 5 disposed therebetween, and are disposed at a predetermined interval.

Figure 12:
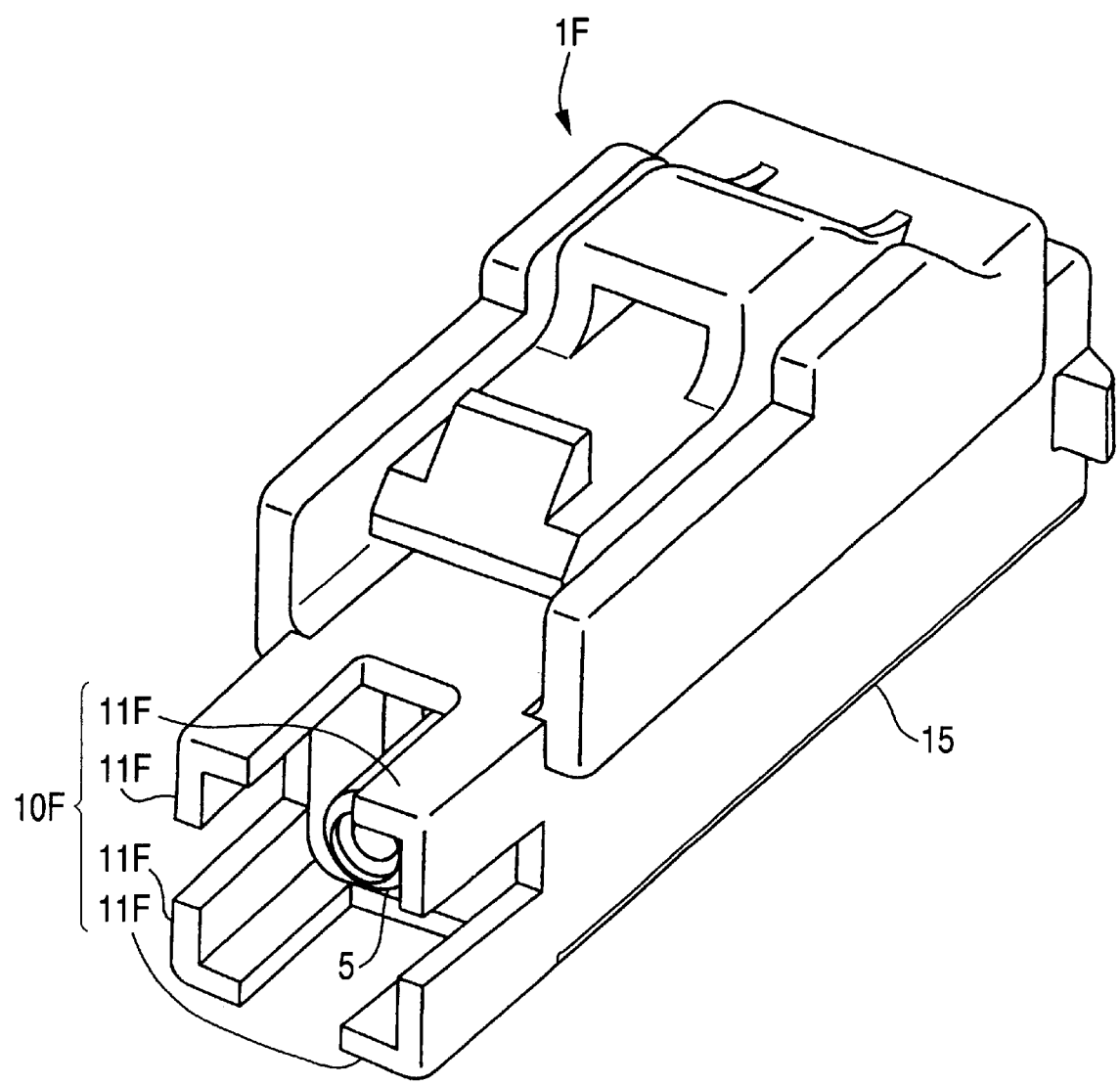
FIG. 12 is a perspective view of a fifth modified optical connector.
Figure 13:
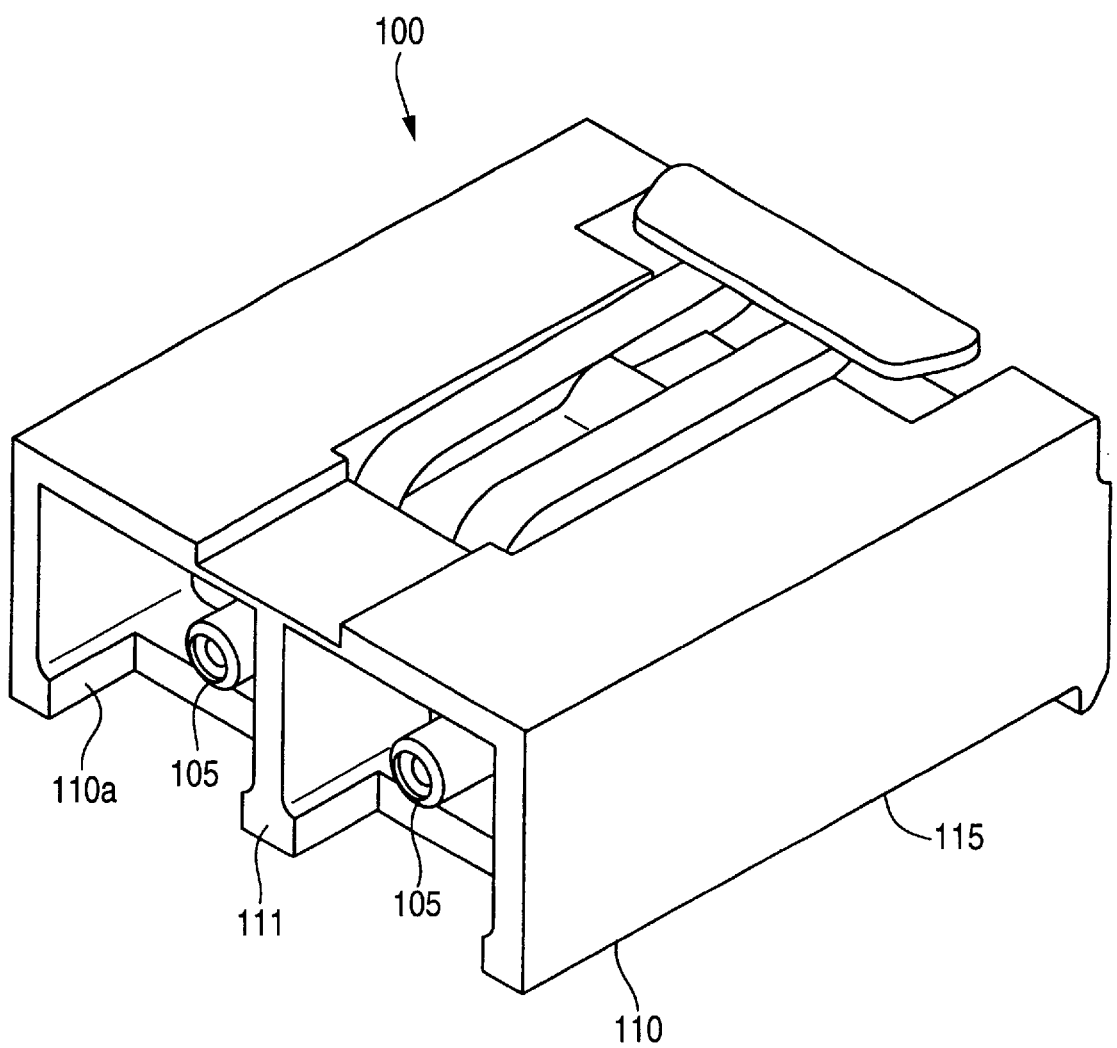
FIG. 13 is a perspective view showing a second embodiment of an optical connector of the invention.
Figure 14:
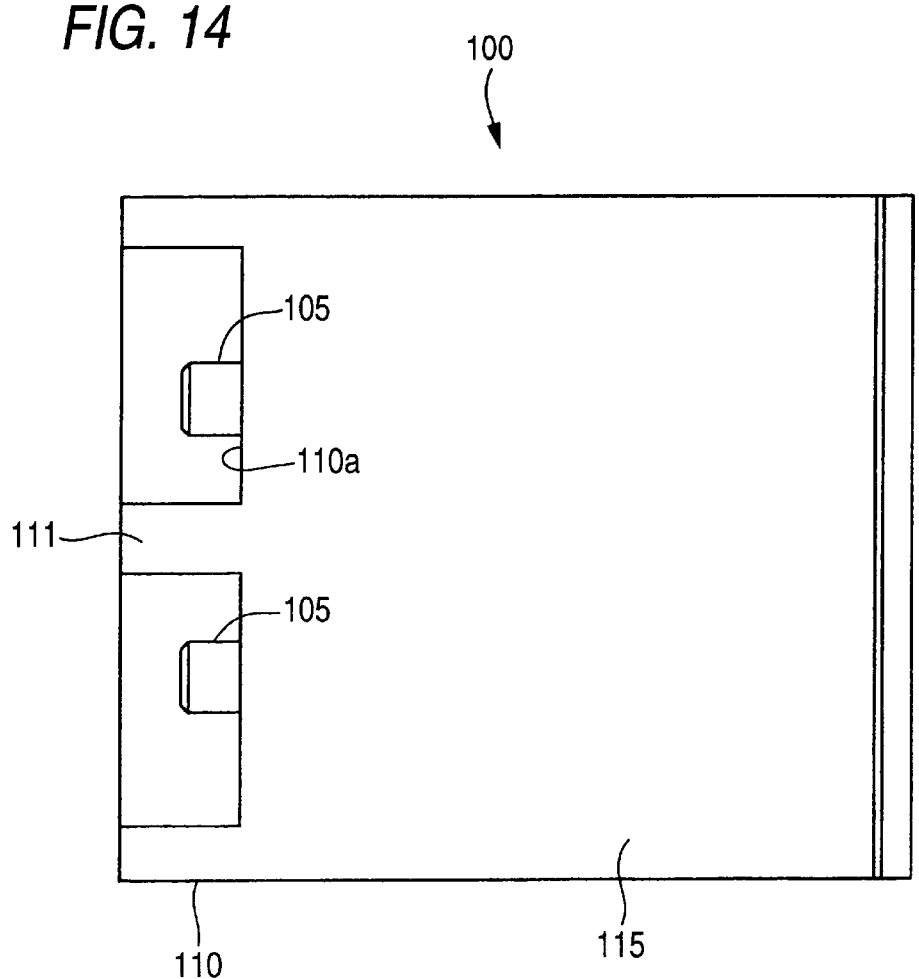
FIG. 14 is a bottom view of the optical connector of FIG. 13.
Figure 15:
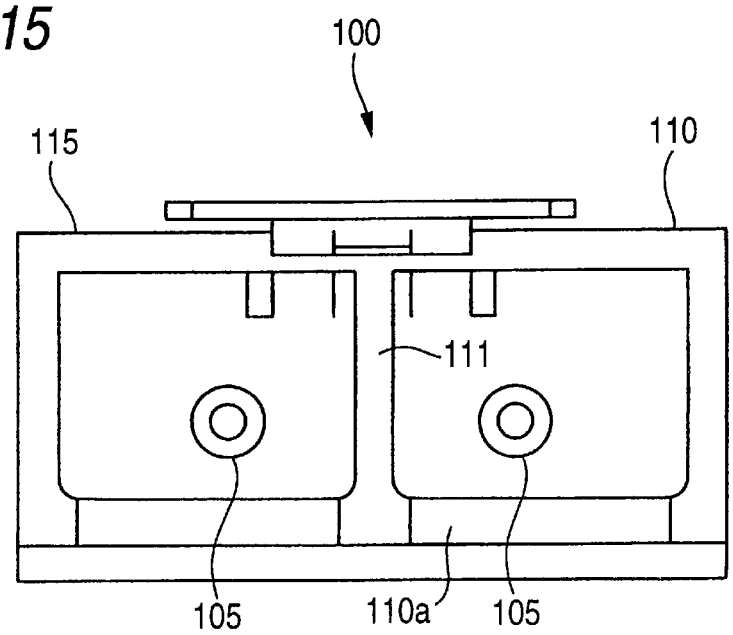
FIG. 15 is a front-elevational view of the optical connector of FIG. 13.
Figure 16:
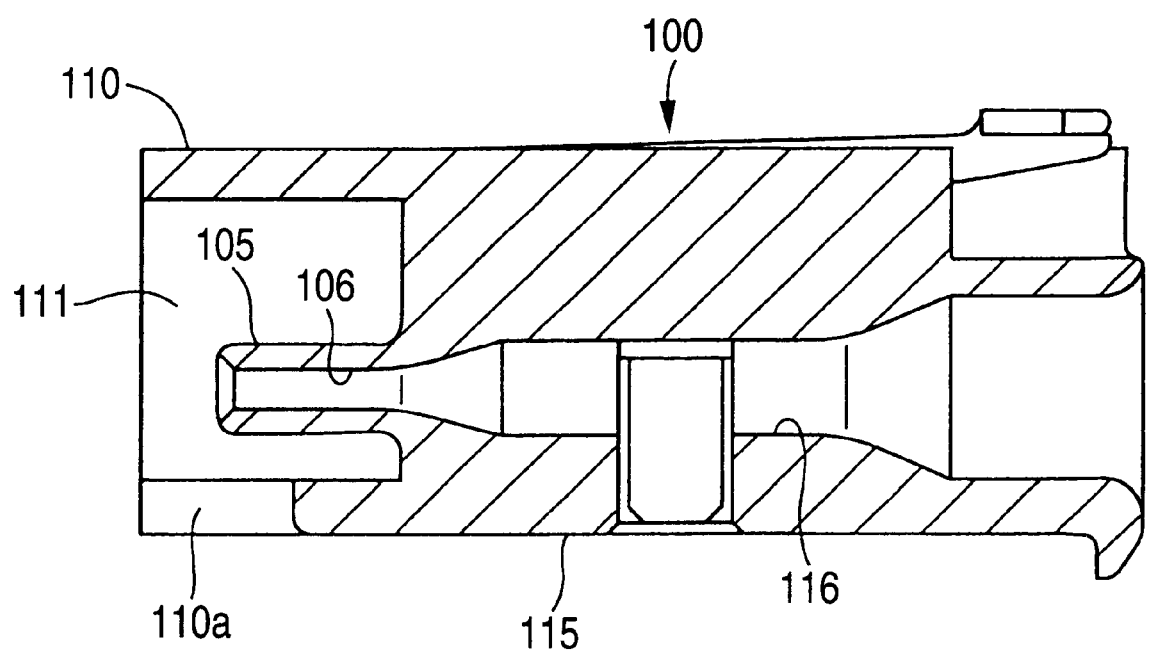
FIG. 16 is a cross-sectional view of the optical connector of FIG. 13.

In a fifth modified optical connector 1F shown in FIG. 12, a protective hood portion 10F is formed into a substantially square tubular shape, having a substantially square cross-section, and surrounds a ferrule portion 5, and four notches are formed respectively in opposite side walls and upper and lower walls of this protective hood portion 10F, with four corner portions 11F thereof remaining intact. Namely, this protective hood portion 10F is formed by the four corner portions 11F extending respectively from four corner portion of a front end of a housing body portion 15 in a direction away from a rear end of this housing body portion 15.

Particularly in the fourth and fifth modified optical connectors among the above modified optical connectors, the opposed upper and lower walls of the protective hood portion 10E, 10F are notched, and for applying the specular processing to the end surface of the optical fiber 61, the specular processing member 71 of a narrow, elongate square pillar-like shape is fitted in the two notches in such a manner that this specular processing member 71 is firmly held against the end surface of the optical fiber 61, and in this condition the specular processing can be applied to this end surface. Therefore, the positional relation between the specular processing member 71 and the end surface of the optical fiber 61 can be easily kept constant.

In the fifth modified optical connector, the upper, lower and opposite side walls of the protective hood portion 10F are notched, and when the specular processing member 71 is to be held against the end surface of the optical fiber 61, the positional relation between the two can be viewed also from the opposite sides of the protective hood portion 10F, and therefore this specular processing operation can be effected more easily and accurately.

(Second Embodiment)

Next, a second embodiment of the present invention will be described.

As shown in FIGS. 13 to 16, in this optical connector 100, a pair of substantially tubular ferrule portions 105 each for receiving and holding an end portion of an optical fiber 61 are formed integrally with a housing body portion 115 at a front end thereof, and are juxtaposed to each other at a predetermined interval. A protective hood portion 110, surrounding the two ferrule portions 105, is formed integrally with the housing body portion 115 at the front end thereof.

The housing body portion 115 is formed into a substantially flattened, rectangular parallelepiped shape, and two receiving hole portions 116, similar in construction to the receiving hole portion 16 of the first embodiment, are formed in the housing body portion 115, and are juxtaposed to each other at a predetermined interval. As described above for the first embodiment, end portions of optical fiber cords 60 are received and held in these receiving hole portions 116, respectively. When each optical fiber cord 60 is inserted into the corresponding receiving hole portion 116, an end portion of the optical fiber 61, exposed at the end portion of the optical fiber cord 60, is inserted into an optical fiber passage hole 106 (which is formed in the ferrule portion 105, and is disposed on a line of extension of the corresponding receiving hole portion 116), and is received and held in this optical fiber passage hole 106 (see FIG. 3 with respect to the manner of holding the optical fiber cord 60).

In this optical connector 100, the protective hood portion 110 of a substantially tubular shape is formed integrally with and projects from the front end of the housing body portion 115 in surrounding relation to the two ferrule portions 105, the protective hood portion 110 projecting beyond the distal ends of the two ferrule portions 105. A notch 110a is formed in the distal end portion of the protective hood portion 110, and each ferrule portion 105 can be observed through the notch 110a from the side. Preferably, the notch 110a is formed such that when the distal ends of the ferrule portions 105 are pressed toward a flat member, the ferrule portions 105 will not abut against this flat member.

In this second embodiment, the protective hood portion 110 is formed into a substantially square tubular shape having a substantially rectangular transverse cross-section, and surrounds the pair of ferrule portions 105, and the notch 110a is formed in a lower wall of this protective hood portion 110. The protective hood portion 110 can have any other suitable shape as described above for the first embodiment.

In this second embodiment, the protective hood portion 110 is thus formed in surrounding relation to the plurality of ferrule portions 105, and therefore the protective hood portion 110 has an increased internal space, so that the finger or others can easily intrude into the protective hood portion 110 to damage the end surface of the optical fiber 61 received in each ferrule portion 105 within this protective hood portion 110. Therefore, in this second embodiment, a partition wall 111, separating the two ferrule portions 105 from each other, is formed integrally with the housing body portion 115 so as to make the fingers or others less liable to intrude into the protective hood portion 110, thereby sufficiently protecting the end surfaces of the optical fibers 61. This partition wall 111 functions also to reinforce the protective hood portion 110.

In this optical connector 100 of the second embodiment, also, for the same reasons as described above for the first embodiment, the production thereof is easy, and the specular processing operation at the end of each ferrule portion 105 can be effected easily, and besides the end surface of the optical fiber 61 at the end of the ferrule portion 105 can be sufficiently protected.

Although this second embodiment is directed to the optical connector having the two ferrule portions 105, the invention can be applied also to an optical connector having three or more ferrule portions.

(Modification of the Second Embodiment)

Figure 17:
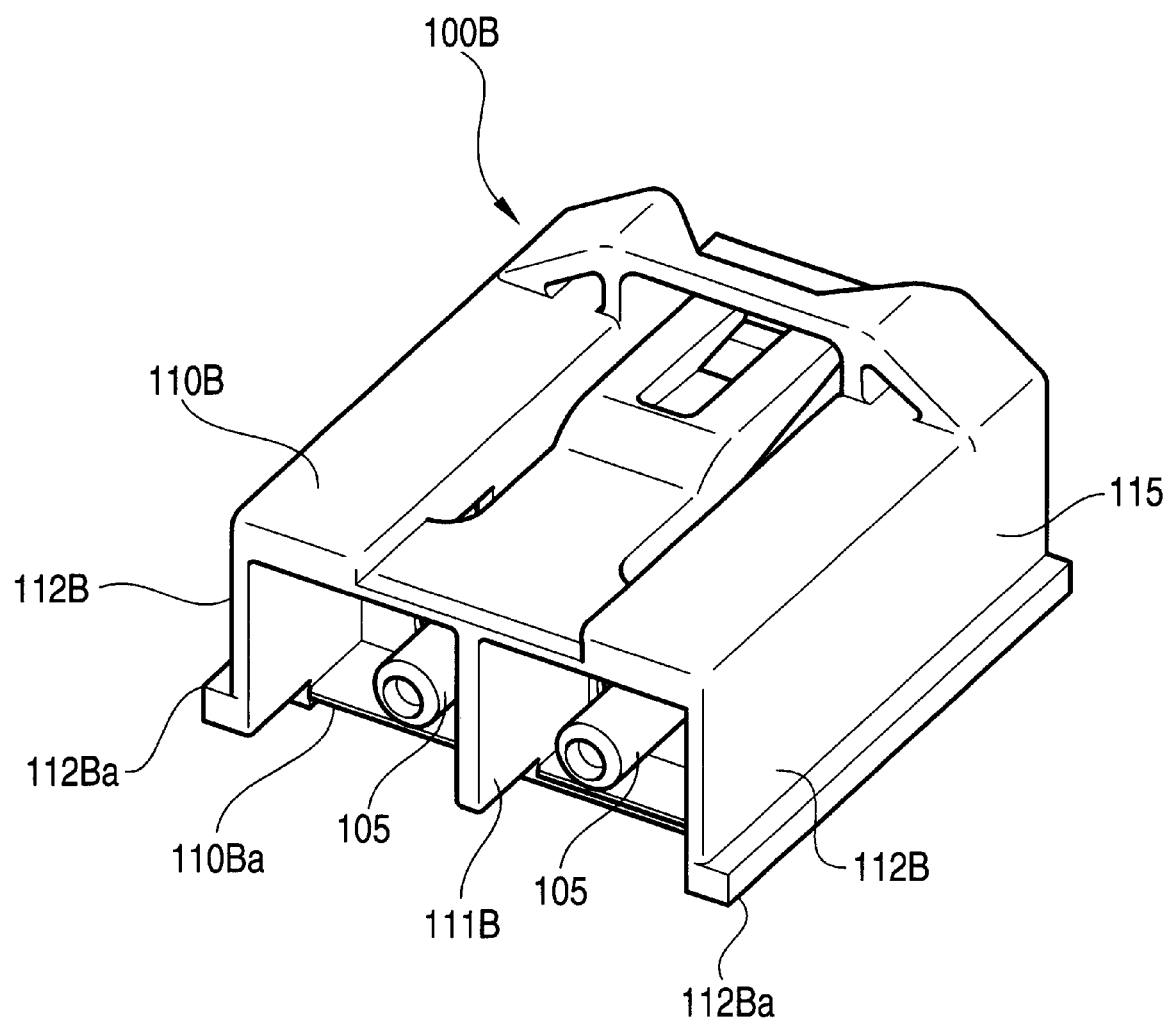
FIG. 17 is a perspective view showing a modified optical connector of the second embodiment.
Figure 18:
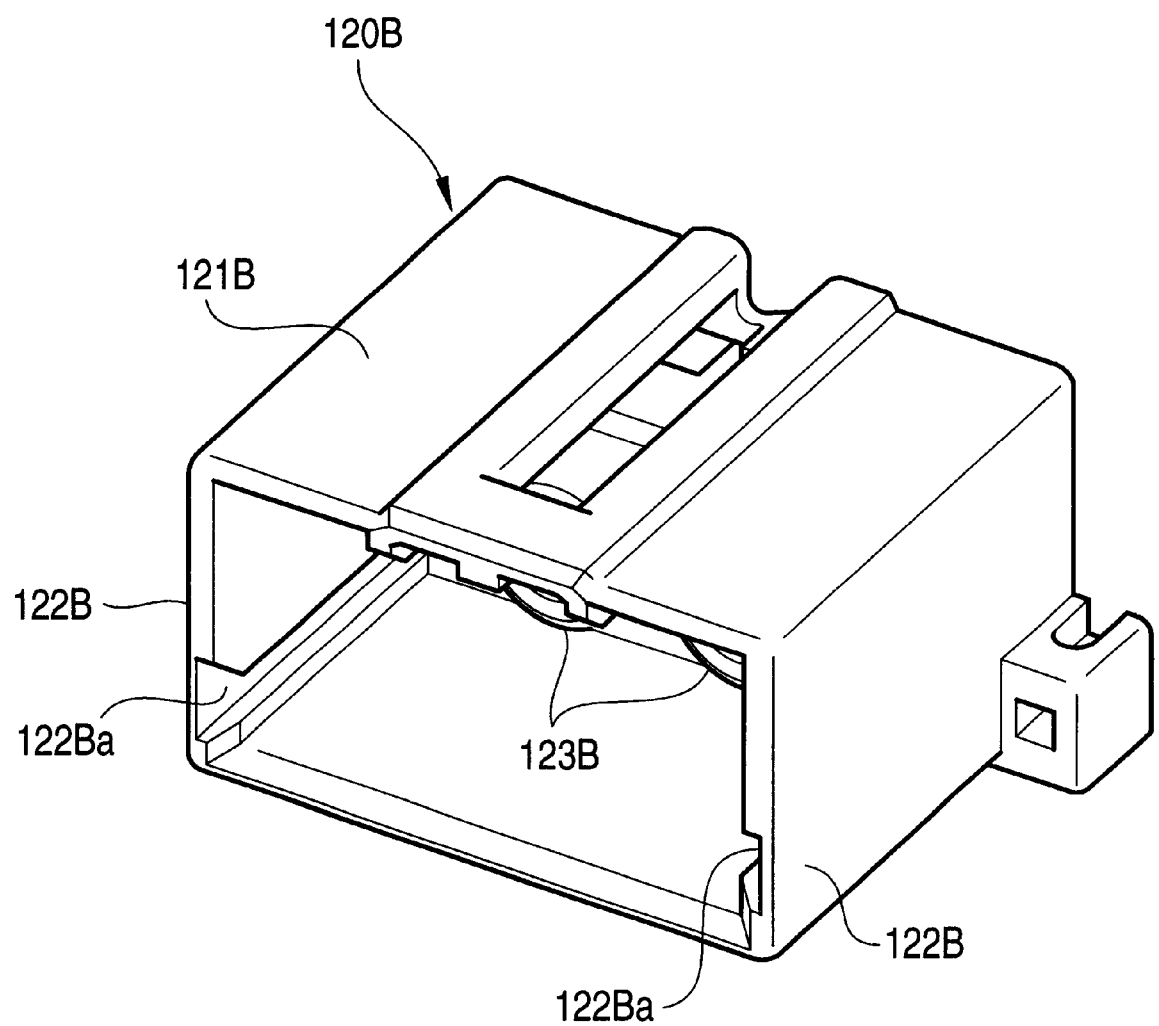
FIG. 18 is a perspective view showing an optical connector to which the modified optical connector of FIG. 17 is to be connected.

A modified example of the optical connector 100 of the second embodiment will be described with reference to FIGS. 17 and 18. The differences from the optical connector 100 will be mainly described, and those constituent elements, identical to those of the optical connector 100, will be designated by identical reference numerals, respectively, and explanation thereof will be omitted.

This optical connector 100B is adapted to be fitted in and connected to a mating optical connector 120B (see FIG. 18), and a pair of outwardly-projecting, elongate projections 112Ba are formed respectively at those portions of a protective hood portion 110B, respectively defining opposite side edges of a notch 110Ba, and extend in a direction of insertion of the optical connector 100B into the mating optical connector 120B.

Namely, in this embodiment, the protective hood portion 110B surrounds two ferrule portions 105, and the notch 110Ba is formed in a lower wall of this protective hood portion 100B over an entire width thereof and also in lower ends of opposite side walls 112B thereof and a lower end of a partition wall 111B.

The outwardly-projecting, narrow elongate projections 112Ba are formed respectively on outer surfaces of the opposite side walls 112B at the lower ends thereof, and extend respectively along these lower ends (which extend in the direction of insertion of the optical connector 100B into the mating optical connector 120B).

The mating optical connector 120B includes a housing portion 121B for fitting on the optical connector 100B, and a pair of photoelectric conversion devices (light-emitting devices or light-receiving devices) are contained in this housing portion 121B, and ferrule guide portions 123B for guiding the ferrule portions 105 respectively toward these photoelectric conversion devices are formed within the housing portion 121B. When the optical connector 100B is fitted into the housing portion 121B to be connected to the mating optical connector 120B, the ferrule portions 105 are guided respectively toward the photoelectric conversion devices (contained in the housing portion 121B) by the ferrule guide portions 123B, so that optical fibers, held in the optical connector 100B, are optically coupled respectively to the photoelectric conversion devices contained in the optical connector 120B.

Positioning guide channel-shaped recess portions 122Ba each in the form of an elongate groove are formed respectively in inner surfaces of opposite side walls 122B of the housing portion 121B of the optical connector 120B, and extend in the direction of connection of the optical connector 100B, and the elongate projections 112Ba can be slidably inserted into these channel-shaped recess portions 122Ba.

For connecting the optical connector 100B to the optical connector 120B in an inserted manner, the elongate projections 112Ba are slidably inserted respectively into the positioning guide channel-shaped recess portions 122Ba, thereby guiding the insertion of the optical connector 100B into the optical connector 120B. The optical connector 100B has a non-rotation-symmetrical shape (when viewed from the front side thereof) because of the formation of the elongate projections 112Ba, and therefore at this time the optical connector 100B is prevented, for example, from being inserted upside down into the optical connector 120B, thus preventing the wrong insertion of the optical connector 100B into the optical connector 120B. Then, when the optical connector 100B is completely inserted into and connected to the optical connector 120B, the elongate projections 112Ba are engaged in the positioning guide channel-shaped recess portions 122Ba, respectively, thereby preventing the rattling of the optical connectors 100B and 120B relative to each other, and therefore an optical misalignment of each optical fiber (received in the optical connector 100B) with the corresponding photoelectric conversion device in the optical connector 120B is prevented.

In this modified optical connector 100B of the above construction, the outwardly-projecting, elongate projections 112Ba are formed respectively at those portions of the protective hood portion 110B, respectively defining the opposite side edges of the notch 110Ba, and extend in the direction of insertion of the optical connector 100B into the mating optical connector 120B. Therefore, the elongate projections 112Ba serve as reinforcing portions at the opposite side edges of the notch 110Ba, and prevent the chipping of the protective hood portion 110B at the opposite side edges of the notch 110Ba, for example, when connecting the optical connector 100B to the optical connector 120B in an inserted manner.

Preferably, elongate projections are formed at the opposite side edges of the notch in each of the protective hood portions 10, 10B, 10C, 10D, 10E and 10F of the first embodiment and its modified examples.

[Advantageous Effects of the Invention]

As described above, in the optical connector of the present invention, the substantially tubular ferrule portion for receiving and holding the end portion of the optical fiber is formed integrally with and projects from the housing body portion, and also the protective hood portion is formed integrally with the housing body portion. Therefore, the production of the optical connector can be effected easily. This protective hood portion has a substantially tubular shape, and is formed integrally with and projects from the housing body portion in surrounding relation to the ferrule portion, and extends beyond the distal end of the ferrule portion, and the notch, through which the distal end portion of the ferrule portion can be observed from the side, is formed in the distal end portion of the protective hood portion. Therefore, the end surface of the optical fiber at the distal end of the ferrule portion can be sufficiently protected by the protective hood portion. And besides, since the notch is formed in the protective hood portion, the positional relation between the distal end portion of the ferrule portion and the predetermined specular processing member can be viewed through this notch, and thus the specular processing operation can be effected utilizing this notch, and therefore this specular processing operation can be easily carried out.

In the optical connector, in which the notch is formed into such a shape that when the distal end of the ferrule portion is pressed toward a flat member at any angle, the ferrule portion will not abut against the flat member, the end surface of the optical fiber at the distal end of the ferrule portion can be sufficiently protected more positively.

In the optical connector, in which the protective hood portion is formed into a substantially square tubular shape, and the opposed two side walls of the protective hood portion are notched, the specular processing operation can be effected utilizing the notches, formed respectively in the opposed side walls, and therefore this specular processing operation can be carried out more easily.

In the optical connector, in which the protective hood portion is formed into a substantially square tubular shape, and the four side walls of the protective hood portion are notched with four corner portions thereof remaining intact, the specular processing operation can be effected utilizing the notches, formed respectively in the four side walls, and therefore this specular processing operation can be carried out more easily.

In the optical connector of the invention, the plurality of substantially tubular ferrule portions for respectively receiving and holding the end portions of the optical fibers are formed integrally with the housing body portion, and also the protective hood portion of a substantially tubular shape is formed integrally with the housing body portion. This protective hood portion has a substantially tubular shape, and is formed integrally with and projects from the housing body portion in surrounding relation to the plurality of ferrule portions, and extends beyond the distal ends of the ferrule portions, and the notch, through which the distal end portions of the ferrule portions can be observed from the side, is formed in the distal end portion of the protective hood portion. Therefore, the end surfaces of the optical fibers at the distal ends of the ferrule portions can be sufficiently protected by the protective hood portion. And besides, since the notch is formed in the protective hood portion, the positional relation between the distal end portion of each ferrule portion and the predetermined specular processing member can be viewed through this notch, and thus the specular processing operation can be effected utilizing this notch, and therefore this specular processing operation can be easily carried out.

When the protective hood portion is thus formed in surrounding relation to the plurality of ferrule portions, the protective hood portion has the increased internal space, so that the finger or others can easily intrude into the protective hood portion. Therefore, in the invention, the partition wall, separating the two ferrule portions from each other, is formed integrally with the housing body portion so as to prevent the fingers or others from intruding into the protective hood portion, thereby more sufficiently protecting the end surfaces of the optical fibers.

In the invention, the notch is formed in that side wall of the protective hood portion which is to be opposed to the mounting board, having the mating optical connector mounted thereon, when the optical connector is connected to the mating optical connector. In this case, the photoelectric conversion device, contained in the mating optical connector, can be disposed in opposed relation to the ferrule portion within the protective hood portion in such a manner that part of this photoelectric conversion device projects outwardly from the interior of the protective hood portion 10 through the notch, and therefore there is achieved an advantage that the optical fiber, received in the ferrule portion, can be optically coupled directly to the photoelectric conversion device.

In the invention, the outwardly-projecting, elongate projections are formed respectively at those portions of the protective hood portion, respectively defining the opposite side edges of the notch, and extend in the direction of insertion of the optical connector into the mating optical connector. In this case, the chipping of the protective hood portion at the opposite side edges of the notch is prevented.

What is claimed is:
1. An optical connector comprising:
a housing body portion,
a substantially tubular ferrule portion for receiving and holding an end portion of an optical fiber, said ferrule portion being formed integrally with and projecting from said housing body portion, and
a protective hood portion of a substantially tubular shape formed integrally with and projecting from said housing body portion in surrounding relation to said ferrule portion, and extending beyond a distal end of said ferrule portion, wherein
a notch, through which the distal end portion of said ferrule portion can be observed from a side, formed in a distal end portion of said protective hood portion,
wherein said optical connector is adapted to be connected to a mating optical connector which contains a photoelectric conversion device, and is mounted on a predetermined mounting board.
2. The optical connector according to claim 1, wherein
said notch is formed so that when the distal end of said ferrule portion is pressed toward a flat member at any angle, said ferrule portion does not abut against said flat member.
3. The optical connector according to claim 1, wherein
said protective hood portion is formed into a substantially square tubular shape, and one side wall of said protective hood portion is notched.
4. The optical connector according to claim 1, wherein
said protective hood portion is formed into a substantially square tubular shape, and opposed two side walls of said protective hood portion are notched.
5. The optical connector according to claim 1, wherein
said protective hood portion is formed into a substantially square tubular shape, and four side walls of said protective hood portion are notched with four corner portions thereof remaining intact.
6. An optical connector comprising:
a housing body portion,
a plurality of substantially tubular ferrule portions for respectively receiving and holding end portions of optical fibers, said ferrule portions being formed integrally with said housing body portion, and
a protective hood portion of a substantially tubular shape formed integrally with and projecting from said housing body portion in surrounding relation to said plurality of ferrule portions, and extending beyond distal ends of said ferrule portions, wherein
a notch, through which the distal end portions of said ferrule portions can be observed from a side, formed in a distal end portion of said protective hood portion,
wherein said optical connector is adapted to be connected to a mating optical connector which contains a photoelectric conversion device, and is mounted on a predetermined mounting board.
7. The optical connector according to claim 6, wherein
a partition wall is formed integrally with said housing body portion, and separates said ferrule portions from each other.
8. The optical connector according to claim 1, wherein
a side wall of said protective hood portion, which is to be opposed to said mounting board when said optical connector is connected to said mating optical connector, is notched.

9. The optical connector according to claim 1, wherein said optical connector is adapted to be fitted in a mating optical connector, and outwardly-projecting, elongate projections are formed respectively at those portions of said protective hood portion, respectively defining opposite side edges of said notch, and extend in a direction of insertion of said optical connector into said mating optical connector.

10. The optical connector according to claim 6, wherein a side wall of said protective hood portion, which is to be opposed to said mounting board when said optical connector is connected to said mating optical connector, is notched.

11. The optical connector according to claim 6, wherein said optical connector is adapted to be fitted in a mating optical connector, and outwardly-projecting, elongate projections are formed respectively at those portions of said protective hood portion, respectively defining opposite side edges of said notch, and extend in a direction of insertion of said optical connector into said mating optical connector.

* * * * *